United States Patent [19]

Howell

[11] 3,981,187
[45] Sept. 21, 1976

[54] METHOD FOR MEASURING THE THERMAL CONDUCTIVITY OF WELL CASING AND THE LIKE

[75] Inventor: Eddie P. Howell, Plano, Tex.

[73] Assignee: Atlantic Richfield Company, Los Angeles, Calif.

[22] Filed: July 7, 1975

[21] Appl. No.: 593,282

Related U.S. Application Data

[63] Continuation-in-part of Ser. No. 454,754, March 25, 1974, abandoned.

[52] U.S. Cl. ............................... 73/154; 73/432 R
[51] Int. Cl.² ..................... E21B 47/06; G01V 9/00
[58] Field of Search ................. 73/15 A, 15 R, 154, 73/432

[56] References Cited
UNITED STATES PATENTS

| | | | |
|---|---|---|---|
| 2,311,757 | 2/1943 | Jakosky | 73/154 |
| 3,668,927 | 6/1972 | Howell et al. | 73/154 |
| 3,714,832 | 2/1973 | Howell et al. | 73/154 |
| 3,807,227 | 4/1974 | Smith, Jr. | 73/154 |
| 3,864,969 | 2/1975 | Smith, Jr. | 73/154 |

*Primary Examiner*—Herbert Goldstein
*Attorney, Agent, or Firm*—Robert M. Betz

[57] ABSTRACT

A method for measuring the thermal conductivity of well casing in situ. The instrument consists of a probe several feet in length lowered into a well and decentralized so that it maintains contact with the casing wall. Two temperature sensors situated adjacent opposite ends of the probe are thermally insulated from an electrically heated intervening portion of the probe body. The probe is moved from one depth to another at a constant predetermined velocity, and the sensors continuously measure the temperature of the casing wall before and after passage of the heated probe portion thereover. The effective thermal conductivity of the casing is directly proportional to the flux applied by the heater and inversely proportional to the temperature change as the heater passes a point along the casing.

2 Claims, 2 Drawing Figures

U.S. Patent   Sept.21, 1976   3,981,187

METHOD FOR MEASURING THE THERMAL CONDUCTIVITY OF WELL CASING AND THE LIKE

RELATED APPLICATIONS

This is a continuation-in-part of application Ser. No. 454,754, filed Mar. 25, 1974, now abandoned.

BACKGROUND OF THE INVENTION

1. Field of the Invention.

This invention relates to a process for making thermal conductivity measurements in borehole casing.

2. Description of the Prior Art.

So far as Applicant is aware, there is no presently available well logging method for making in situ measurements of the thermal conductivity of well casing. The closest prior art found concerns a system for making thermal conductivity measurements in a dry borehole as, for example, in U.S. Pat. No. 3,668,927. This patent teaches a logging probe having a temperature sensor, a heater and expander means inserted into a borehole. The expander means is actuated so that the temperature sensor contacts the side wall. The heater then heats the sensor, and temperature measurements are made at predetermined time intervals. The slope of the curve relating temperature with time (plotted logarithmically) is linear and proportional to the thermal conductivity of the earth. Such a device requires that a sensing element be driven into the side wall of the borehole and left in that position for a period of time sufficient to generate data to establish the curve after which relocation at a different borehole position may be accomplished.

A specific need for a method of the character to be described in this application is present in permafrost wells. It has been found that the production of a well drilled through a permafrost layer causes thawing radially outward from the well-bore because of the internal heat generated within the well. When the well is not operating, the permafrost may refreeze around the well casing. The external pressures on the casing thus developed may exceed its collapse rating. Thawing also may result in subsidence of the permafrost layer with consequent damage to the well casing.

In order to minimize the thawing effect upon the permafrost as described, it is necessary to insulate the casing in some manner. For example, insulation may be introduced in the annular space separating a doubled wall string of production casing. In accordance with known techniques, this insulation may be in the form of a gel or an evacuated space.

It is desirable, therefore, to devise a method whereby the effective thermal conductivity of well casing, particularly in permafrost, may be quickly and accurately determined. This will enable location of insulation breakdown, liquid leaks, casing collapse, and peripheral contact between casing strings, etc., which affect conductivity. Thus, the invention may help to locate high conductivity zones where permafrost thaw may occur during production. Such zones may then be monitored for subsidence or refreeze problems.

The method to be described herein may find secondary use in determining the thermal conductivity of a borehole before installation of the casing. This type of measurement may thus help in determining the actual amount of insulation needed on the casing. If this measurement is combined with measurement by conventional means of temperature change in the borehole with increasing depth, it may also permit calculation of actual earth heat flux for use in predicting the actual depth of permafrost.

It is, therefore, a general object of this invention to provide a novel method for in situ measurement of thermal conductivity of a wellbore casing.

It is a further object of this invention to provide a method for measurement of the insulation quality of permafrost well casing thermal conductivity that is simple in operation and yields its information rapidly.

It is yet another object of this invention to provide a novel method for measurement of thermal conductivity of a bore-hole prior to installation of casing therein.

It is still another object of this invention to provide a novel method for calculating earth heat flux in the vicinity of a borehole.

SUMMARY OF THE INVENTION

In accordance with the method of the present invention, a probe for measuring the effective thermal conductivity of well casing is provided with a pair of temperature sensors situated adjacent its opposite ends. These sensors are thermally insulated from an intermediate length of the probe which is electrically heated. The probe is lowered into a well and an upwardly extending curved surface thereof is urged into contiguous contact with the casing wall by means of a decentralizing bow spring. As the probe is moved from one depth to another at a constant velocity, successive points along the wall are subjected for at least a known time interval to a known heat flux generated by the electric heater. The sensors respectively measure the temperature of the casing wall from point to point before and after such heat flux is applied. The time interval is long enough so that the temperature rise at each such point is substantially unaffected by the density of specific heat of the wall. The effective thermal conductivity of the casing is directly proportional to the heat flux applied and inversely proportional to the resultant temperature increase as the heater passes successive points along the casing.

The invention thus comprises a method for making in situ thermal conductivity measurements within a wellbore casing comprising the steps of continuously measuring the temperature of the casing wall at successive points, thereafter applying a known heat flux for a known time interval at each such point, and measuring the rise in temperature at each point as a function of effective thermal conductivity. For a wellbore casing of known geometry, the thermal conductivity at each point will vary inversely with the temperature increase responsive to the application of the heat flux. More particularly, the method requires incorporating the source of known heat flux within a down hole logging probe traveling at a constant velocity such that said heat flux is applied at each depth for at least a predetermined interval of time. This time is sufficient to establish a linear relation between the rise in temperature at each depth and the thermal conductivity of the casing wall at such depth. The existence of an anomaly manifested by higher thermal conductivity is revealed by a decrease in the expected temperature increase as the probe progresses from point to point.

DESCRIPTION OF THE PREFERRED EMBODIMENTS

Figure 1:
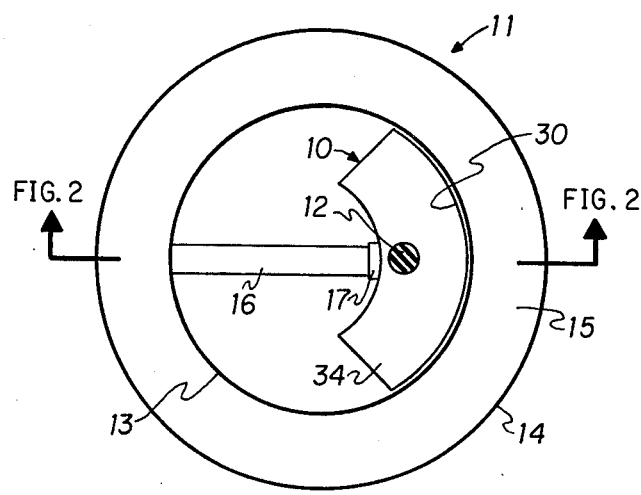
FIG. 1 illustrates a plan view of a logging probe in accordance with the invention situated within a wellbore and maintained in contact with the casing wall thereof.
Figure 2:
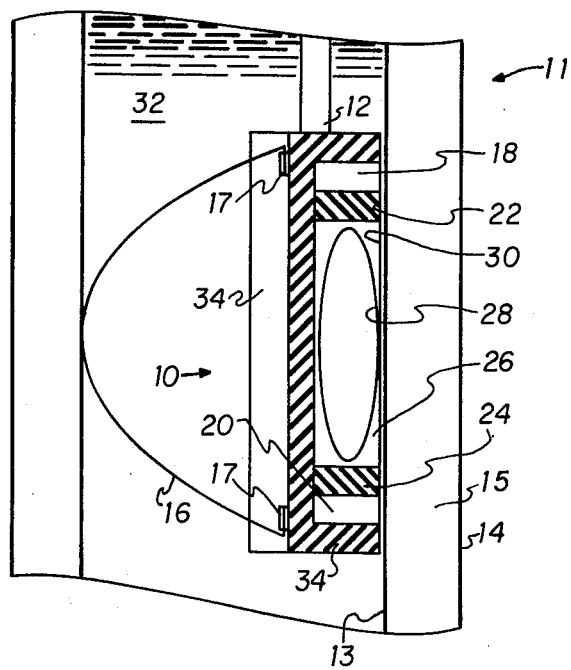
FIG. 2 is a section along line 2—2 in FIG. 1.

Referring now to FIGS. 1 and 2, apparatus is shown for making thermal conductivity well casing measurements in accordance with the present invention. A probe 10 is lowered within an insulated wellbore casing 11 by means of cable 12. In accordance with known art, casing 11 may comprise inner wall 13 and outer wall 14 with insulative means 15, such as a gel or an evacuated container, introduced in the intervening annular space. The probe 10, for example, several feet in length, is maintained in contact with the inner wall 13 by means of a bow spring 16 extending in a vertical plane and having its upper and lower ends clamped to suitably spaced exterior brackets 17. Temperature sensors 18 and 20, such as thermistors, are situated respectively at or adjacent to the upper and lower ends of the probe 10 and are separated by internal sections of thermal insulation 22 and 24 from the intermediate heater section 26. Heating means such as an electrical heater 28, consisting for example of a plurality of coils of wire, is positioned within section 26 in such a fashion that it uniformly and effectively heats the entire length of the convex vertically extending wall 30 (FIG. 1) of high thermal conductivity which interfaces with and conforms to the casing wall 13.

By conductive means not shown, suitable electrical connections from the surface may be made through cable 12 to temperature sensors 18 and 20 and to electrical heater 28. This will enable the control of the heat flux and the recording of the necessary temperature readings. In order to thermally insulate the sensors 18 and 20 and the electrical heater 28 from the produced fluid 32 such as oil filling the space within casing 11, further insulation 34 may encase all outer surfaces of the probe 10 with the exception of thermally conductive wall 30.

For a casing 11 of constant cross-sectional thickness and generally uniform geometry, its effective thermal conductivity may be expressed by the equation:

$$K = \frac{Q}{\Delta T} \cdot C$$

where
K = thermal conductivity in cal./cm./sec./°C.
Q = heat flux in cal./sec.
$\Delta T$ = temperature difference in °C.
C = an empirically determined constant.

In this equation, Q represents the heat flux applied by the electrical heater 28. $\Delta T$ is the difference between $T_1$, the temperature at a point on the wall 13 before application of the flux Q and $T_2$, the temperature at such point after application of such flux.

K in this equation is in reality dependent upon the several conductivities of the surface 30, the inner and outer walls 13 and 14, and the insulation 15. The constant C is dependent upon the geometry of the casing and also takes into account the fact that the probe 10 only contacts a portion of the entire circumferential surface 13 as it moves from one location to another.

The text entitled "Conduction of Heat and Solids" by Carslaw and Jaeger, copyright 1959 by the Oxford University Press, presents on page 345, Example IV, a discussion of a theoretical method for determining thermal conductivity of an infinite medium incorporated by reference herein. In accordance with this method, heat is applied at a uniform rate, Q, for a time, t, to a perfectly conductive cylinder surrounded by the medium. The temperature rise of the medium at the cylindrical surface is expressed as a function of heating time; heating rate, Q; and thermal conductivity, K. It develops that a curve of temperature rise against the natural log of time has a linear asymptote of slope (Q/K); and this if Q is known, K is determinable immediately. Until the linear portion of this curve is reached corresponding to shorter heating time intervals, the temperature rise of the medium is also affected by its density and specific heat. If, however, the heating time is sufficient, the temperature increase in the medium becomes independent of its density and specific heat and varies linearly with the quantity, Q.

Using the above analysis as a starting point, the Applicant has experimentally determined that if a known heat flux, Q, is applied at each depth of wall 13 for a sufficient time interval, the short term effects of density and specific heat of the casing material may be safely ignored. Stated otherwise, the technique is to move the probe 10 slowly enough to insure that a linear relation is established between temperature rise and casing thermal conductivity.

In operation, the probe 10 is lowered into the well to a desired depth. Temperature measurements are thereafter made as the probe 10 is moved at a predetermined logging speed, and usually in an upward direction. The upper sensor 18 measures the normal or unheated temperature of the wall 13 at successive points or locations. The lower sensor 20 thereafter measures the temperature of the wall 13 at these same points or locations after they have been subjected to heat flux produced by heater 28 for a period of time determined by the effective length of the heated probe section 28 in contact with the wall 13. If the heat flux Q is maintained substantially constant and the probe 10 is moved at a constant velocity so that this "dwell time" is sufficient, the effective thermal conductivity K at a point along the wall 13 is, therefore, inversely proportional to $\Delta T$. A value of Q may be chosen to normally produce approximately a 10°F temperature increase on wall 13. If a point along the casing 11 exhibits a breakdown in insulation 15 or some other anomaly coupled with a higher effective thermal conductivity, the heated wall temperature $T_2$ will increase above the normal wall temperature $T_1$ to a lesser degree at that point in any given length of time than if no such breakdown were present. Therefore, the quantity $\Delta T$ will decrease as the probe passes over a point or section of wall 13 of poorer insulation, thereby revealing the presence of the anomaly.

At any given moment sensors 18 and 20 will measure the temperatures of two points along the wall 13 separated by the spacing of such sensors. However, by known means, a surface record of the readings of the sensor 18 may be subjected to a suitable time delay before combining with that of sensor 20. In this manner the difference in sensor readings at any time represents the temperature increase at a particular point (and hence the thermal conductivity) independent of the length of the probe 10 and of the speed of its travel.

EXAMPLE I

Assuming the following values for the wellbore casing 11, to wit:
Thermal conductivity, $K = 0.125$ Btu/hr/ft/°F
Specific heat, $Cm = 0.1$ Btu/lb/°F
Density, $\rho = 500$ lb/ft$^3$
Inner casing radius, $r = 0.5$ ft
the "dwell" time, t, at each depth should be at least 1.39 minutes. For a probe 10 whose effective vertical heated interface with the casing 11 is 20.8 feet, the upper limiting logging speed is 15 feet per minute.

In a practical situation, the average values of the above-listed casing parameters are either known or may be estimated with reasonable accuracy and an initial logging run performed. If, based on these assumed values, the measured values of K, using the method of this invention, are consistently above the estimated average by a significant factor, say two or three times, the logging speed may be reduced until this measured value is equal to or less than such estimated value. At this point, variations in K indicative of the presence of anomalies may be examined with greater precision by rerunning the log at significantly reduced speed at the depths where such anomalies are indicated.

The method of this invention may be practiced in substantially the manner described above by lowering a probe 10 of suitable configuration (not shown) into an uncased borehole, applying heat flux therefrom to the wall of the borehole while the probe 10 is moved therealong and taking temperature measurements of the wall before and after heating at successive points. As with the cased borehole, the movement of probe 10 must be slow enough to establish a linear relation between earth thermal conductivity and temperature rise at each point therealong. Thermal conductivity readings obtained in this fashion can furnish necessary information in determining the quantity and type of insulation needed to surround or incorporate in well casing.

EXAMPLE II

Assuming the following values for the formation surrounding an uncased borehole, to wit:
Thermal conductivity, $K = 1.0$ Btu/hr/ft/°F
Specific heat, $Cm = 0.3$ Btu/lb/°F
Density, $\rho = 140$ lb/ft$^3$
Wellbore radius, $r = 0.5$ ft
the "dwell" time at each depth should be at least 13.2 minutes. For a probe 10 having an effective vertical heated interface with the wellbore of 20 feet, an upper limiting logging speed is found to be 1.52 feet per minute.

The procedure as previously outlined for a cased bore-hole may again be followed to insure substantial agreement between the estimated and measured values of average thermal conductivity.

The method can be further extended to measurement of earth heat flux at a given depth in the vicinity of the borehole by measuring the difference between the two unheated or normal borehole temperature readings a few feet apart at approximately such depth. From the equation $Q = K\Delta T$ where $Q$ = earth heat flux, $K$ = earth thermal conductivity, and $\Delta T$ is the above expressed temperature difference, one may calculate values for the desired earth heat flux. This heat flux value has a higher value in the vicinity of oil-bearing formations than it does near nonoil-bearing formations. It may also be of value in predicting the actual depth of permafrost.

It should now be clear from the foregoing that the apparatus of this invention is useful not only in determining the presence of insulative breakdown by making comparative temperature readings but also in making direct calculation of effective thermal conductivity at specific points.

What has been described and shown in connection with the foregoing preferred embodiment is intended as illustrative only of this invention and not by way of limitation. Accordingly, it is understood that many modifications of said embodiment will occur to those skilled in the art without departing from the scope and spirit of the invention as set forth more particularly in the appended claims.

The embodiment of the invention in which an exclusive property or privilege is claimed are defined as follows:

1. The method of measuring the earth heat flux at a selected depth adjacent an uncased borehole comprising the steps of:
    a. measuring the temperature of the well bore at said depth,
    b. thereafter applying a known constant heat flux to the well bore at said depth for at least a predetermined time interval sufficient to establish a linear relation between the corresponding temperature rise and the earth thermal conductivity at said depth,
    c. measuring the correponding rise in temperature of the well bore at said depth,
    d. measuring the temperature gradient in the unheated well bore between two positions separated therein by a predetermined vertical distance at approximately said depth, and
    e. calculating a value for the earth heat flux in the vicinity of said depth as a function of the earth thermal conductivity at said depth and of said temperature gradient, wherein the steps are performed in part by moving past said depths at a constant logging speed a well logging probe carrying a pair of vertically spaced apart temperature sensors responsive to the temperature of said bore hole at their respective levels, means for electrically heating a portion of the probe intermediate said sensors, and means for decentralizing the probe so that it is urged into thermal conductive contact with said bore hole, the value of said logging speed being equal to or less than the quotient formed by dividing the length of effective heated interface between said heating means and the bore hole by said predetermined time.

2. The method of claim 1 wherein said earth heat flux is determined in accordance with the formula $Q_E = K_E \Delta T_E$ where
    $Q_E$ = earth heat flux in cal./cm$^2$/sec.,
    $K_E$ = earth thermal conductivity in cal./cm/sec.°C,
    $\Delta T_E$ = temperature gradient in °C.

* * * * *